United States Patent Office 3,198,082
Patented Aug. 3, 1965

3,198,082
ELECTRICAL PRIMARY FLIGHT CONTROL SYSTEM UTILIZING REDUNDANT CHANNELS
Wolfram Eduard K. Kerris, North Hollywood, Calif., assignor to Lockheed Aircraft Corporation, Burbank, Calif.
Filed Nov. 9, 1962, Ser. No. 236,514
7 Claims. (Cl. 91—1)

This invention relates to a "fly-by-wire" or electrical primary flight control system for aircraft, spacecraft, and like vehicles.

The need for an electrical flight control system, with its advantages of faster response and finer incremental control over conventional mechanical systems, becomes more evident as aircraft grow in size and are subjected to a broader range of flying conditions. However, traditionally the mechanical systems, wherein the pilot's control inputs are transmitted to the control surfaces by mechanical cables, have been looked upon as being more reliable than a system wherein the pilot's control inputs are transmitted through electrical means.

Accordingly, it is a general object of the present invention to provide an electrical flight control system having a degree of reliability approaching or surpassing that of mechanical systems. This is accomplished in the present invention by utilizing redundant or multiple power transmitting channels which terminate in a common power summing device. At least three channels in parallel are used so that if there is a malfunction in one of the channels, it can be over-ridden by the remaining two channels in a "majority vote" analogy.

It is another object of the present invention to provide a mechanical means for automatically disconnecting the malfunctioning channel from the power summing device.

These and other objectives and features of the present invention will be better understood by reference to the folowing detailed description taken in conjunction with the drawings wherein:

FIGURE 5 is a fragmentary, elevational view, partly in section, of the disconnect mechanism, said mechanism being in the unlatched position.

Figure 1:
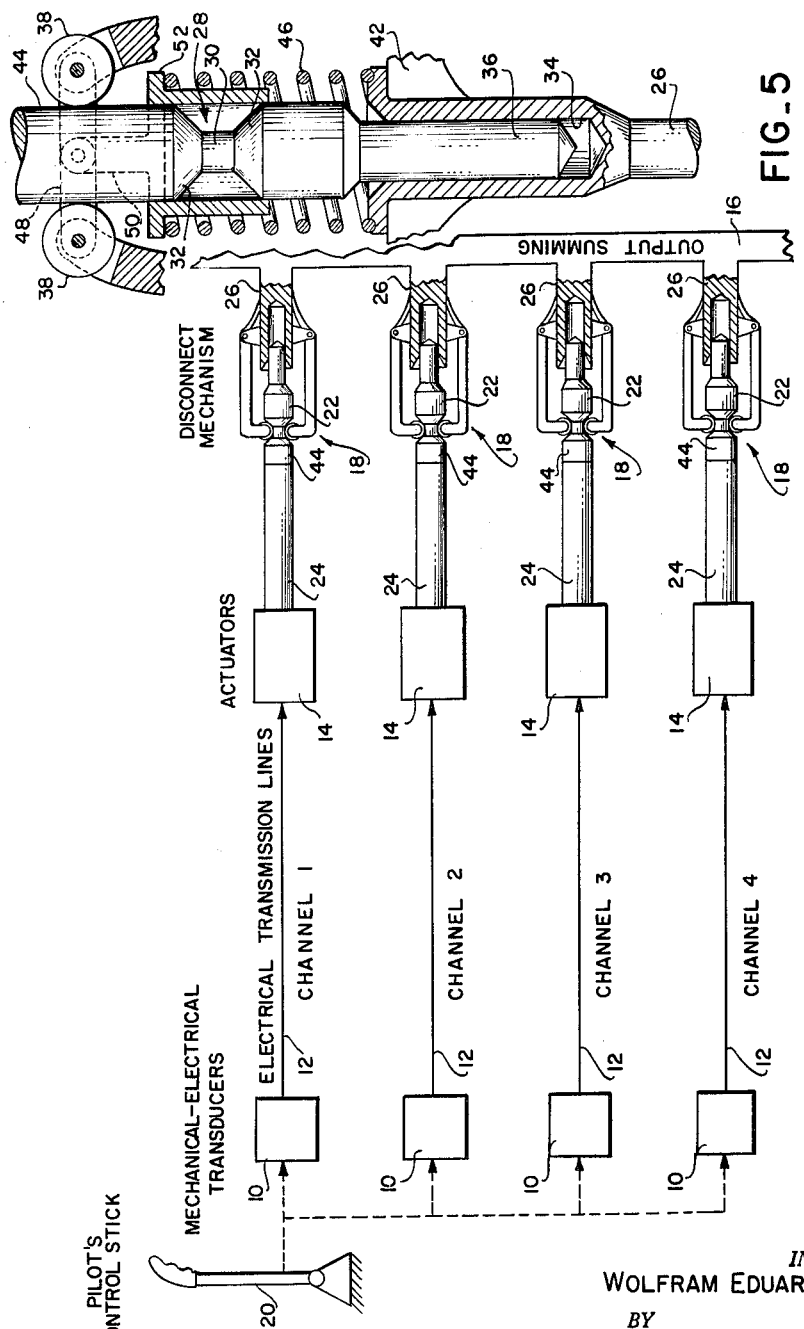
FIGURE 1 is a schematic diagram of the present electrical primary flight control system.

In FIGURE 1, the present primary electrical flight control system is shown as having four power transmission channels in parallel. Each channel has a stick transducer 10, electrical wires 12, and an actuator 14. Each channel is connected to a common power summing device 16 through a disconnect mechanism 18.

Stick transducer 10 converts mechanical inputs from the pilot's control stick 20 to electrical signals. In a D.C. system, transducer 10 may comprise of one of any number of conventional potentiometers with varying physical and electrical characteristics. In an A.C. system, the potentiometers could be replaced with synchros. In practice, the transducers would be located near the control stick.

The pilot's control inputs, converted to electrical signals by the transducers 10, are transmitted to the vicinity of the control surfaces some distance away from the cockpit by means of wires 12. These wires are preferably made of heavy gauge wire and installed in conduits to prevent damage.

Actuators 14 may comprise of an electro-hydraulic transfer valve operating a hydraulic piston with a mechanical feedback linkage. It may also comprise of pneumatic or hot gas servos where the use of hydraulics is excluded by the environment, or it may comprise of electrical servomotors. In practice, the actuators would not be placed abreast of one another on one side of the summing device, as shown schematically in FIGURE 1, but they may be arranged in pairs at opposite ends of a centrally pivoted lever arm so that one pair of actuators works in one direction and the other pair works in the opposite direction. Other arrangements will also be obvious to those skilled in the art.

The disconnect mechanism 18, to be described in greater detail hereinafter, is the means by which a "majority vote" of the respective actuator outputs can be taken and transmitted to the output summing device. The output summing device 16 may be either the input to the control valve of the main hydraulic actuators for the control surface or it may be the input to the control surface itself.

Figure 2:
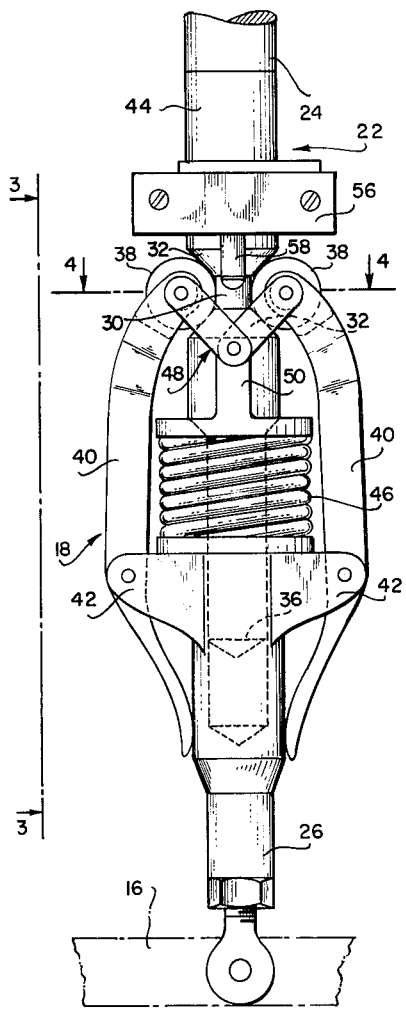
FIGURE 2 is an elevational view of the disconnect mechanism used in the above system, said mechanism being in the latched or engaged position.

Disconnect mechanism 18 comprises a cylindrical spindle or a latch portion 22 connected to the actuator output piston rod 24, and a shank 26 which is connected by suitable means to summing device 16 (FIGURE 2). Latch portion 22 has a groove 28 defined by a reduced diameter section 30 and identical frustro-conical sections 32 (FIGURE 5). Shank 26 has a bore 34 which is adapted to receive the tip 36 of the spindle, as shown in FIGURE 5.

Figure 3:
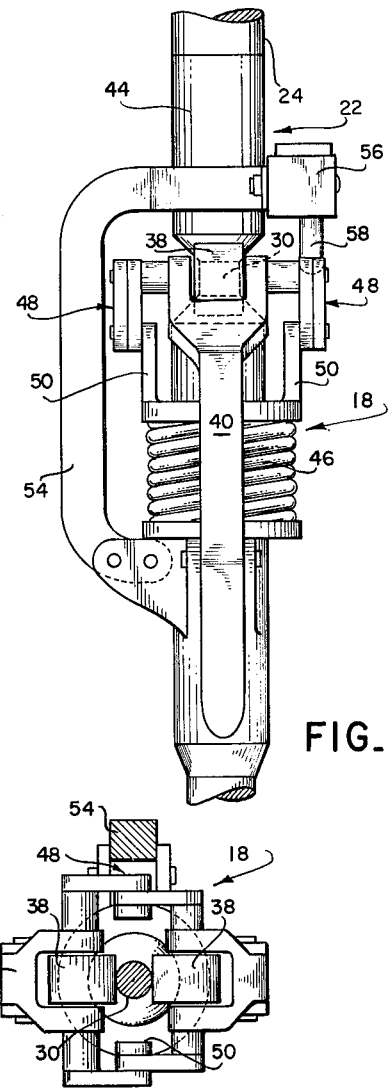
FIGURE 3 is another elevational view of the disconnect mechanism taken along the line 3—3 of FIGURE 2.
Figure 4:
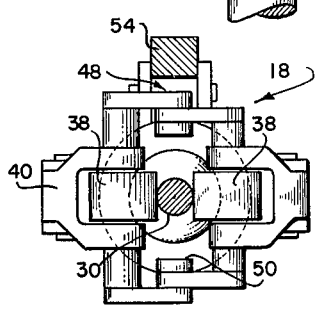
FIGURE 4 is another view of the disconnect mechanism taken along the line 4—4 of FIGURE 2.

The latch engaging means or detent means comprise a pair of rollers 38 rotatably mounted on the end of leaf springs 40 attached to shank 26 by suitable brackets 42. In normal operation, i.e., when all of the channels are functioning normally, leaf springs 40 keep rollers 38 engaged in groove 28, as shown in FIGURES 2 to 4, and each actuator is mechanically coupled to the summing device 16. However, when a malfunction occurs in one of the channels so that this channel is dead or is acting in opposition to the normally functioning channels, spindle 22 in the malfunctioning channel may be either pushed into shank 26 or pulled away from shank 26 by the over-riding force of the normally functioning channels. In the malfunction condition shown in FIGURE 5, spindle 22 is pushed into shank 26, forcing rollers 38 out of groove 28 and onto the cylindrical portion 44 of the spindle. Once the rollers are forced out of groove 28, the actuator in the malfunctioning channel is no longer coupled to the summing device 16. Thus, there is an automatic disconnecting of the malfunctioning channel from the summing device. Recoupling of the malfunctioning channel is prevented by means of a coil spring 46 working through a knee joint 48 attached at the ends to rollers 38 and in the center to a link 50 integral with a sleeve member 52 on the spindle 22. When the rollers are engaged with groove 28, the authority of springs 40 is greater than the authority of spring 46 but once the rollers are forced out of the groove, then spring 46 keeps the knee in the extended or straightened position shown in FIGURE 5, and prevents re-engagement of the rollers 38 with the groove 28.

Shank 26 also carries an arm 54 (FIGURE 3) to which is attached an annunication switch 56 which is suitably connected to a warning light on the pilot's instrument panel (not shown). Upon malfunction of any particular channel, the extension of knee 48 depresses plunger 58 for actuation of switch 56, and gives notice of the malfunction to the pilot.

The component parts of the present flight control system having been described in detail, the operation of the system as a whole will now be described. In keeping with the basic principle of redundancy, each of the channels has an independent source of electrical power and of hydraulic or other power for the servos in addition to the components previously described. Thus, each channel operates independently of the others, and their individual outputs are combined or summed at a common point represented by the summing device. When failure occurs in one of the channels, the remaining channels act in a "majority vote" analogy and override the malfunctioning channel. The latter channel is then automatically disconnected from the control system in the manner previously described.

Failures or malfunctions in the system can be of two kinds: a "hardover" failure where a channel operates in opposition to the remaining channels and a "dead" failure which may consist of either one of two conditions, depending upon the design. A dead failure may occur when an actuator is simply inoperative and offers no opposition to the remaining actuators. A dead feature may also occur when an actuator is blocked or rendered immobile. In a hardover failure, the malfunctioning channel is automatically disengaged from the summing device in a manner previously described, and remains disengaged until it is reset. In the first described dead failure, the defective channel presents no other force than friction and therefore remains engaged and is carried along by the remaining channels. In the second described dead failure, the end result is the same as in a hardover failure; that is, the malfunctioning channel is automatically disengaged from the summing device by the disconnect mechanism.

Although the system has been previously described in conjunction with four channels, it will be apparent that a system having only three channels may also be used. A system having four channels will permit two successive malfunctions to occur without violation of the "majority vote" concept, and therefore will give a higher degree of reliability.

Although certain configurations and arrangements have been given above for illustrative purposes, it will be understood that the scope of the present invention is to be limited only by the appended claims.

I claim:

1. An electrical primary flight control system comprising: at least three parallel power transmitting channels; an actuator in each of said channels; a device for summing the actuator outputs of said channels; and a disconnect mechanism for disconnecting a malfunctioning channel from said summing device, said disconnect mechanism including: a spindle connected to the actuator output rod and having an annular groove with beveled sides; a shank attached to the summing device and adapted to receive the spindle; opposing roller means carried by said shank and being adapted to engage said groove during normal operation of the channel and to be disengaged from said groove in the event of a channel malfunction; and a spring biased knee joint connecting said roller means for keeping the roller means disengaged after a malfunction of the channel has occurred.

2. A control system according to claim 1, wherein the disconnect mechanism includes an annunciation switch operable by distension of the knee joint.

3. A control system according to claim 1, wherein the roller means are mounted on leaf springs.

4. A mechanism for disconnecting a malfunctioning channel in an electrical flight control system utilizing redundant power transmitting channels having actuators attached to a common power summing device, said mechanism comprising: latch means integral with the actuator output rod; a shank attached to the summing device and adapted to receive the latch means; and latch detent means carried by the shank, said detent means being engaged with the latch during normal operation of the channel and adapted to be disengaged from the latch in the event of a malfunction of the channel.

5. A mechanism according to claim 4, including spring means on said shank to prevent engagement of the detent means with the latch means once a malfunction has occurred.

6. A mechanism for disconnecting a malfunctioning channel in an electrical flight control system utilizing redundant power transmitting channels having actuators attached to a common power summing device, said mechanism comprising: a spindle integral with the actuator output rod and having an annular groove with beveled sides; a shank attached to the summing device and adapted to receive the spindle; opposing roller means carried by the shank and being spring-biased to engage said groove during normal operation of the channel and to be disengaged from said groove in the event of a malfunction of the channel; and a spring-biased knee joint connecting said roller means for keeping the roller means disengaged after a malfunction has occurred.

7. An electrical primary flight control system comprising: at least three parallel power transmitting channels; an actuator in each of said channels; a device for summing the actuator outputs of said channels; and a disconnect mechanism disposed between each of said actuators and said summing device for automatically disconnecting a malfunctioning channel from said summing device, said mechanism having: latch means integral with the actuator output rod; a shank attached to the summing device and adapted to receive the latch means; latch detent means carried by the shank, said detent means being engaged with the latch means during normal operation of the channel and adapted to be disengaged from the latch means in the event of a malfunction of the channel; and means on said shank to prevent engagement of the detent means with the latch means once a malfunction has occurred.

References Cited by the Examiner

UNITED STATES PATENTS

| | | | |
|---|---|---|---|
| 3,011,741 | 12/61 | Denniston | 244—83 |
| 3,051,418 | 8/62 | Ramsey | 244—83 |
| 3,095,783 | 7/63 | Flindt | 91—363 |
| 3,095,784 | 7/63 | Calhoun | 91—363 |
| 3,100,861 | 8/63 | Osder | 244—77 |

SAMUEL LEVINE, *Primary Examiner.*